United States Patent [19]

Kubick

[11] Patent Number: 4,822,149

[45] Date of Patent: Apr. 18, 1989

[54] PRISMATIC FERROELECTRIC BEAM STEERER

[75] Inventor: Frederick W. Kubick, White Plains, N.Y.

[73] Assignee: United Technologies Corporation, Hartford, Conn.

[21] Appl. No.: 585,760

[22] Filed: Mar. 2, 1984

[51] Int. Cl.[4] .................. G02F 1/29

[52] U.S. Cl. .................. 350/389; 350/380; 350/390; 350/401; 350/402

[58] Field of Search .................. 350/355, 356, 374, 379, 350/380, 384, 389, 390, 392, 400, 401, 402, 406

[56] References Cited

U.S. PATENT DOCUMENTS

| | | | |
|---|---|---|---|
| 2,591,701 | 4/1952 | Jaffe | 88/61 |
| 2,600,962 | 6/1952 | Billings | 88/65 |
| 2,939,142 | 5/1960 | Fernsler | 343/754 |
| 3,257,608 | 6/1966 | Bell et al. | 325/0.5 |
| 3,305,292 | 2/1967 | Miller | 350/389 |
| 3,334,958 | 8/1967 | Appeldorn | 350/211 |
| 3,369,242 | 2/1968 | Johnson | 343/754 |
| 3,393,034 | 7/1968 | Imai | 350/260 |
| 3,445,851 | 5/1969 | Sheldon | 343/754 |
| 3,458,247 | 7/1969 | Buhrer et al. | 350/401 |
| 3,499,701 | 3/1970 | Macek et al. | 350/150 |
| 3,503,670 | 3/1970 | Kosanke et al. | 350/150 |
| 3,507,550 | 4/1970 | Harris et al. | 350/150 |
| 3,512,864 | 5/1970 | Haertling et al. | 350/388 |
| 3,513,323 | 5/1970 | Sincerbox et al. | 250/225 |
| 3,522,985 | 8/1970 | Rogers | 350/157 |
| 3,528,728 | 9/1970 | Rogers | 350/157 |
| 3,555,987 | 1/1971 | Browning | 95/53 |
| 3,558,215 | 1/1971 | DeLang et al. | 350/150 |
| 3,559,185 | 1/1971 | Burns et al. | 350/389 |
| 3,574,441 | 4/1971 | Harris et al. | 350/150 |
| 3,575,487 | 4/1971 | Ohm et al. | 350/150 |
| 3,575,488 | 4/1971 | Ohm et al. | 350/150 |
| 3,614,754 | 10/1971 | Cummins | 350/389 |
| 3,623,795 | 11/1971 | Taylor et al. | 350/150 |
| 3,631,501 | 12/1971 | Buscher et al. | 343/754 |
| 3,744,875 | 7/1973 | Haertling et al. | 350/150 |
| 3,781,086 | 12/1973 | Kumada et al. | 350/150 |
| 3,809,461 | 5/1974 | Baumgardner et al. | 350/302 |
| 3,868,172 | 2/1975 | Ii et al. | 350/150 |
| 3,938,878 | 2/1976 | Fox | 350/150 |
| 4,129,357 | 12/1978 | Frosch et al. | 350/157 |
| 4,154,505 | 5/1979 | Kato et al. | 350/150 |
| 4,197,008 | 4/1980 | Pinnow et al. | 356/150 |
| 4,201,450 | 5/1980 | Trapani | 350/150 |
| 4,222,638 | 9/1980 | Robert | 350/96.14 |
| 4,229,073 | 10/1980 | Lotspeich | 350/150 |
| 4,327,971 | 5/1982 | Kondo et al. | 350/388 |

OTHER PUBLICATIONS

Taylor et al., "Ferroelectric Light Valve Arrays for Optical Memories" IEEE Trans. on Sonics & Ultrasonics 1972, pp. 81–99.

Smith et al., "Optical Properties & Switching in $Gd_2(MoO_4)_3$" Physics Letts., vol 28A, 1-13-69, pp. 501–502.

M. B. Klein, *Dielectric Waveguide Modulators at 95 GHz Using LiNbO1(*)*, International Journal of Infrared and Millimeter Waves, vol. 3, No. 5 (1982).

M. B. Klein, *Phase Shifting at 94 GHz Using the Electro-Optic Effect in Bulk Crystals,* International Journal of Infrared and Millimeter Waves, vol. 2, No. 2, (1981).

Cecil E. Land and Philip D. Thacher, *Ferroelectric Ceramic Electrooptic Materials and Devices,* Proceedings of the IEEE, vol. 57, No. 5, May 1969.

*International Dictionary of Physics and Electronics,* D. Van Nostrand Company, Inc., Princeton (1956).

*Primary Examiner*—John K. Corbin
*Assistant Examiner*—Martin Lerner

[57] ABSTRACT

A ferroelectric beam steering device for operation at millimeter wavelengths applicable for use as a component in radar systems. Electrodes direct fields reversibly and continuously modify the refractive character of the ferroelectric material of the device as incoming radiation passes along the optic axis of the material.

9 Claims, 2 Drawing Sheets

PRISMATIC FERROELECTRIC BEAM STEERER

The Government has rights in this invention, pursuant to Contract No. DAAK21-81-C-0089 awarded by the Department of the Army.

TECHNICAL FIELD

This invention relates to millimeter (MM) wavelength devices employing anisotropic, nonlinear dielectric materials which exhibit electro-optic variability, and more particularly to the design and fabrication of microwave and radar components operable at millimeter wavelengths, in particular frequencies in the range of 95 Gigahertz (GHz).

BACKGROUND ART

Ferroelectric materials have become well known since the discovery of Rochelle salt for their properties of spontaneous polarization and hysteresis. See the *International Dictionary of Physics and Electronics,* D. Van Nostrand Company Inc., Princeton (1956) at pg. 331. Other ferroelectrics including barium titanate have also become familiar subjects of research.

However, the application of the properties of ferroelectric materials to millimeter wavelength devices and radar systems is largely uncharted scientific terrain.

At MM wavelengths, standard microwave practice is hampered by the small dimensions of the working components, such as waveguides and resonant structures. Furthermore, there is a considerable lack of suitable materials from which to make the components. Even beyond this, the manufacturing precision demanded by the small dimensions of the components, makes their construction difficult and expensive. Ferrite phase shifters used at other frequencies are unsuitable, and alternative materials are generally not available.

Ferroelectric materials are accordingly of particular interest, because certain of their dielectric properties change under the influence of an electric field. In particular, an "electro-optic" effect can be produced by the application of a suitable electric field.

As is well known, ferroelectric materials are substances having a non-zero electric dipole moment in the absence of n applied electric field. They are frequently regarded as spontaneously polarized materials for this reason. Many of their properties are analogous to those of ferromagnetic materials, although the molecular mechanism involved has been shown to be different. Nonetheless, the division of the spontaneous polarization into distinct domains is an example of a property exhibited by both ferromagnetic and ferroelectric materials.

A ferroelectric medium has the property that its propagation constants can be changed by applying a sufficiently intense electric field along a suitable direction. This phenomenon is known as the electro-optic effect. Ferroelectric media are unique since they are capable of linear electro-optic activity in contrast to more familiar media wherein the electro-optic activity is typically quadratic. This linear activity, defined as a linear dependence of the refractive index on the applied electric field, is a consequence of the domain structure of the ferroelectric material.

Accordingly, it is an object of this invention to establish a device for the continuous angular steering of a beam of millimeter radiation passing through a ferroelectric medium by electrical means.

It is an object of this invention to develop a millimeter wavelength angular beam steering device for use in radar systems.

It is an object of the invention to develop a ferroelectric millimeter wavelength device for microwave radar application at the millimeter wavelength range, which is reversibly and continuously controllable over a predetermined angular range.

It is a further object of the instant invention to produce a millimeter wavelength ferroelectric beam steerer effective for processing microwave signals in a radar system.

DISCLOSURE OF INVENTION

The instant invention calls for the disposition of a ferroelectric pair of prisms in the path of millimeter wavelength radiation to establish a continuously controllable beam steerer for radar application. The ferroelectric material for the respective prisms has coincidentally aligned optical axes subject to the application of a suitably dimensioned electric field across electrodes straddling the medium. By straddling, it is meant that one electrode is on one side of the ferroelectric material; and another is on the other side thereof. The optic axes of the prisms correspond however to opposing domain states. The axes are subject to a single pair of electrodes for continuous modification of the dielectric and refractive properties of the material.

Variable beam steering is established by the degree of electric field strength applied through the electrodes straddling the prisms. This changes the angle at which the radiation departs from the set of prisms.

BRIEF DESCRIPTION OF DRAWINGS

The invention will be better understood from the following description taken in conjunction with the accompanying drawing, wherein.

BEST MODE FOR CARRYING OUT THE INVENTION

Figure 1:
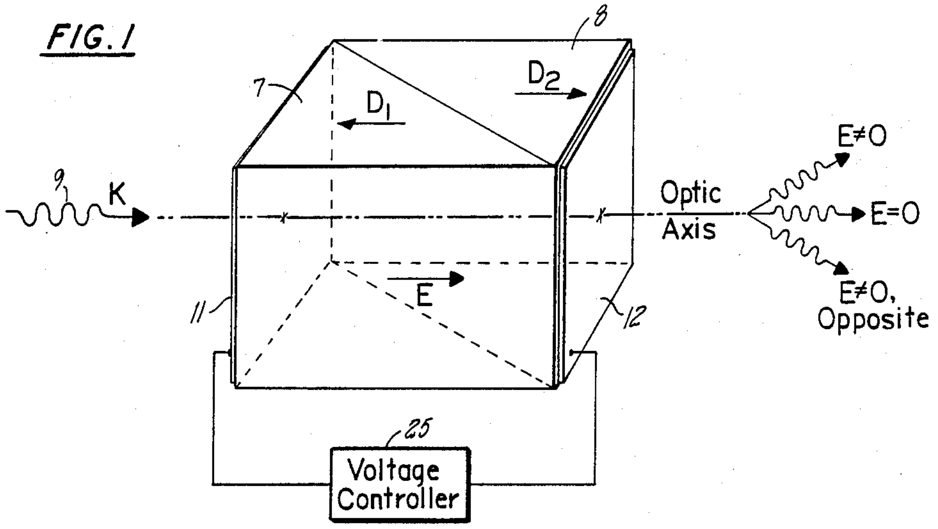
FIG. 1 shows the pair of ferroelectric elements adjacently disposed with electrodes straddling its outer surfaces for applying an electric field to vary the dielectric and refractive properties of the ferroelectric material.

The beam steerer shown in FIG. 1 includes adjacent prisms, respectively 7 and 8, of ferroelectric material subject to incident radiation 9 directed along coincident optic axes of the respective prisms 7 and 8. The direction of propagation of the incident radiation is indicated by arrow "K".

The radiation is characterized, for example, by a frequency of 95 GHz, which corresponds to a millimeter wavelength of 3.16.

The device is straddled by a pair of electrodes, respectively 11 and 12, for applying an electric field derived from voltage source 25 and applied along the direction of wave propagation. Each member of the electrode pair is suitably disposed near the outer walls of respective prisms 7 and 8. Electrode pair 11 and 12 is transparent to the passage of millimeter wavelength radiation.

In FIG. 1, electrode pair 11 and 12 is provided with a suitably strong voltage from voltage source and controller 25 to provide a field in alignment with the optic axes of prisms 7, 8. A suitable field strength would range up to the order of 10 kV/cm.

Figure 2:
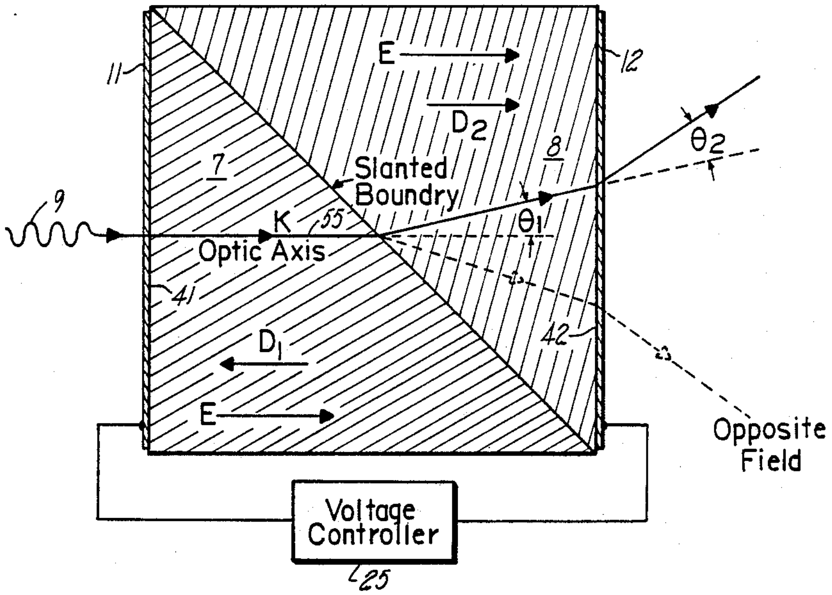
FIG. 2 provides a top view schematically illustrating the wave refraction taking place at the respective material interfaces.

In FIG. 2, a beam 9 of millimeter wavelength radiation is shown entering the back 41 of one prism 7 and leaving the back 42 of the other prism 8 along optic axis 55. The respective backs 41 and 42 are provided with adjacent transparent electrodes, respectively 11 and 12, effective for applying a reversible electric field through voltage controller 25 in the direction of one or the other of the opposing domain orientations D1 and D2. The electrodes 11 and 12 can be a transparent conductive layer applied to the surface of the medium.

Since the direction of propagation of beam 9 is parallel to the optic axis (coincident with the domain orientation), the medium behaves isotropically, passing the beam 9 of radiation.

When the electric field is zero (electrode voltage difference is zero), the radiation passes the slanted interface separating the oppositely directed domains with no refraction. If an electric field is applied in a specific direction, the refractive index of one prismatic component will increase, while that of the other will decrease because of the opposing relationship of the field to the domain orientations in each prism. This change is a consequence of the linear electro-optic effect, known to be particularly strong in ferroelectrics at MM wavelengths. Thus, a net difference in the index of refraction will occur across the slanted boundary (because of opposite domain orientations), and the radiation will be refracted away from its original direction. If the direction of the electric field is reversed, the radiation will be refracted in the opposite direction. The amount of refraction depends on the strength of the applied field, and can cover a significant angle. In this manner, continuous, electrically controlled beam steering is achieved.

Actually, there are two refractions of the radiation, as shown in FIG. 2. At the slanted boundary, the refraction angle is $theta_1$ whose magnitude is typically less than 10 degrees. At the exit face there is a second refraction $theta_2$, which is effectively an amplification of the first, depending on the amount by which the refractive index of the medium exceeds that of its surroundings. The total refraction, given by the sum $theta_1+theta_2$, may have a magnitude as high as 30 degrees. Since the angle that the internally refracted ray makes with the optic axis is not large, the medium remains essentially isotropic as far as the radiation is concerned.

Figure 3:
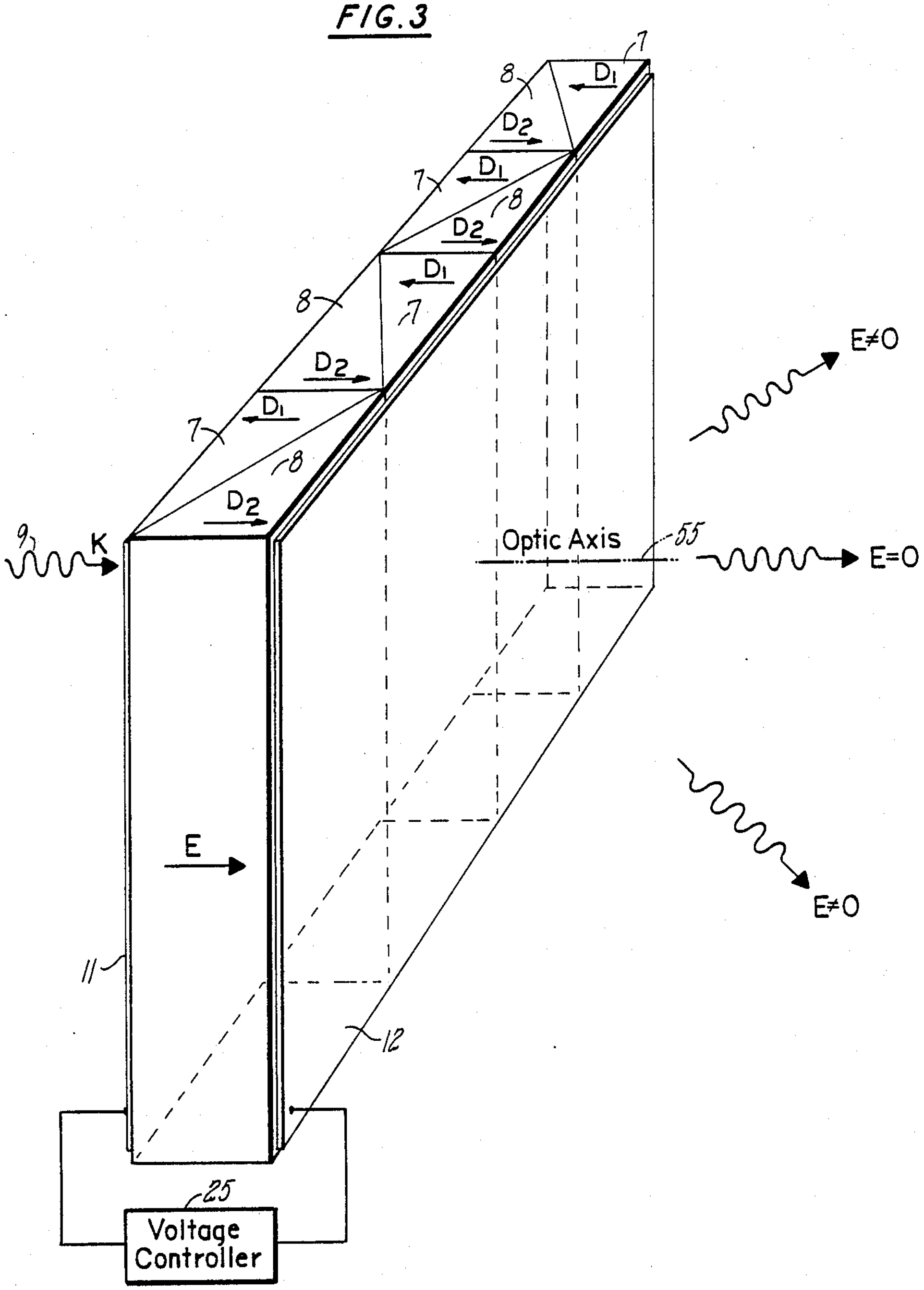
FIG. 3 shows a series of thin prismatic pairs adjacently disposed to produce the same steering effect under material economies effective for reducing the amount of ferroelectric material required.

To minimize absorption losses, the effective length of the medium in the direction of propagation can be reduced by using a series of such biprismatic composites, each being relatively thin, but together forming a large aperture as shown in FIG. 3. In this type of construction, care must be taken to minimize spurious refractive and shadowing effects at the boundaries between individual composites. A smaller propagation length not only reduces losses, but the required electrode voltage for a given field is also reduced.

Significant versatility in the construction of the ferroelectric beam steerer can be realized by the use of dielectric mixtures or structured composites. These consist of particles of the active ferroelectric medium dispersed throughout an inert dielectric filler, either randomly or in a structured fashion.

Ferroelectric materials can be produced as polycrystaline mixtures, which are especially useful. In particular, random mixtures in an inert isotropic medium are of interest to component developers. Polycrystaline mixtures are preferred because of the difficulty of growing single large crystals. For example, a low-index of refraction isotropic medium may be doped with oriented single-domain crystals of a given ferroelectric in appropriate concentrations, endowing the medium with considerable electro-optic properties of the desired kind. Dielectric mixtures or structured composites could be employed for the ferroelectric material.

By controlling the voltage from controller 25 applied across respective electrodes 11 and 22, the output beam of millimeter wavelength radiation can be steered in a desired direction.

After reference to the foregoing, modifications may occur to those skilled in the art. However, it is not intended that the invention be limited to the specific embodiment shown. The invention is broader in scope and includes all changes and modification falling within the parameters of the claims below.

I claim:

1. A device for continuously steering a beam of millimeter wavelength radiation, comprising:

adjacent first and second material media sharing a common slanted boundary, each of said media having the form of a prism, said media being ferroelectric and having coincident optic axes of opposing domains, said axes being disposed in the direction of propagation of said beam of millimeter wavelength radiation;

a pair of flat electrodes straddlingly adjacent said material media, said electrodes being orthogonal to said optic axes; and electric means for providing a voltage between said pair of electrodes to establish a variable electric field across said media for controllably directing the steerage of said beam of millimeter wavelength radiation.

2. The device of claim 1, wherein said pair of electrodes is in the path of said beam of millimeter wavelength radiation.

3. The device of claim 1, wherein said pair of electrodes is transparent to said beam of millimeter wavelength radiation.

4. The device of claim 1, wherein said material media are ferroelectric.

5. A method of continuously steering a beam of millimeter wavelength radiation, comprising the steps of:

directing a beam of radiation having millimeter wavelength characteristics at adjacent first and second material media including a respectively a pair of prisms, said media being ferroelectric and having coincident optic axes with opposing domains, said axes being disposed in the direction of propagation of said beam of millimeter wavelength radiation;

disposing a pair of electrodes straddlingly adjacent said material media, each of said electrodes being orthogonal to said coincident optic axes; and applying a voltage between a pair of electrodes straddlingly adjacent said media.

6. The method of claim 5, wherein said pair of electrodes is in the path of said beam of millimeter wavelength radiation.

7. The method of claim 5, wherein said pair of electrodes is transparent to said beam of millimeter wavelength radiation.

8. Th method of claim 5, wherein said material media are ferroelectric.

9. A device for continuously steering a beam of millimeter wavelength radiation, comprising:

a plurality of adjacent first and second material media, each of said first and second material media sharing a common slanted boundary and each having the form of a prism, said media being ferroelectric and each having coincident optic axes, the first and second material media in each case being of opposing domains and said axes being disposed in the direction of propagation of said beam of millimeter wavelength radiation, said plurality of adjacent first and second material media being disposed in a common plane orthogonal to the direction of propagation;

a pair of electrodes straddlingly adjacent said plurality of material media and orthogonal to the direction of propagation; and electric means for providing a voltage between said pair of electrodes to establish a variable electric field across said media for controllably directing the steerage of said beam of millimeter wavelength radiation.

* * * * *